US00RE35132E

United States Patent [19]

Bay et al.

[11] E Patent Number: Re. 35,132

[45] Reissued Date of Patent: Dec. 26, 1995

[54] SOLID, THIN CHEMILUMINESCENT DEVICE

[75] Inventors: William E. Bay, Ridgefield; John J. Freeman, Stamford, both of Conn.

[73] Assignee: Omniglow Corporation, Novato, Calif.

[21] Appl. No.: 180,603

[22] Filed: Jan. 13, 1994

Related U.S. Patent Documents

Reissue of:

[64] Patent No.: 5,121,302
Issued: Jun. 9, 1992
Appl. No.: 632,852
Filed: Dec. 24, 1990

[51] Int. Cl.[6] ..... F21K 2/00

[52] U.S. Cl. ..... 362/34; 362/84; 252/700; 206/219

[58] Field of Search ..... 362/34, 84, 101; 252/700; 206/219

[56] References Cited

U.S. PATENT DOCUMENTS

| | | | |
|---|---|---|---|
| 3,539,794 | 11/1970 | Rauhut et al. | 362/34 |
| 3,568,354 | 3/1971 | Yacko | 252/700 |
| 3,720,823 | 3/1973 | Black et al. | 362/34 |
| 3,808,414 | 4/1974 | Roberts | 362/84 |
| 3,847,279 | 11/1974 | Montgomery | 206/219 |
| 3,893,938 | 7/1975 | Rauhut | 252/188.3 CL |
| 4,186,426 | 1/1980 | Gingras, Jr. et al. | 362/34 |
| 4,372,745 | 2/1983 | Mandle et al. | 272/700 |
| 4,635,166 | 1/1987 | Cameron | 362/34 |
| 4,751,616 | 6/1988 | Smithey | 362/34 |
| 4,814,949 | 4/1989 | Elliott | 362/34 |
| 4,853,327 | 8/1989 | Dattagupta | 362/34 |

*Primary Examiner*—Ira S. Lazarus
*Assistant Examiner*—Alan Cariaso
*Attorney, Agent, or Firm*—Majestic, Parsons, Siebert & Hsue

[57] ABSTRACT

There is provided a flexible, thin, rectangular, chemiluminescent device comprised of a back sheet of a laminated metal foil having heat sealed thereto at its edges a bi-component front sheet, the first component of which is a laminated metal foil and the second component of which is a transparent or translucent polyolefin sheet, said first and second components being heat sealed to each other at their adjacent latitudinal edge, from about 20% to about 50% of the surface area of said front sheet being comprised of said first component; temporary separation means positioned so as to divide the interior area of said device into two compartments, one under each of said components, the compartment under said second component having positioned therein an absorbent material containing a solvent solution of an oxalate and, optionally, a fluorescer, and the compartment under said first component containing an activator solution.

11 Claims, 1 Drawing Sheet

SOLID, THIN CHEMILUMINESCENT DEVICE

Matter enclosed in heavy brackets [ ] appears in the original patent but forms no part of this reissue specification; matter printed in italics indicates the additions made by reissue.

BACKGROUND OF THE INVENTION

The production of devices capable of emitting light through chemical means is well known in the art. Lightsticks, for example, are taught in U.S. Pat. No. 3,539,794 while other configurations have also been the subject of many U.S. Pat. Nos. e.g. 3,749,620; 3,808,414; 3,893,938. Additional recent patents include U.S. Pat. No. 4,635,166 and U.S. Pat. No. 4,814,949.

The devices shown in FIG. 5 of U.S. Pat. No. 3,893,938 and FIGS. 5 and 8 of U.S. Pat. No. 3,539,795 are those over which the devices of the present invention are an improvement. The devices of this type known in the art fall for many reasons, not the least of which include their inability to emit light over the required period of time, their propensity to emit poor quantities of light, their inability to concentrate light in a centralized or uniform area and the like. The devices of the above two patents, for example, do not prevent degradation of the activator solution from loss of volatile components in that the activator solution is contained in a compartment having a transparent or translucent, permeable surface. Additionally, the material, when present, which is used to absorb the activator solution upon activation of the device has not proven to be entirely successful because of its failure to absorb the activator solution uniformly, thereby causing areas of no or dim light and areas of bright light in the device.

SUMMARY OF THE INVENTION

The present invention relates to a flexible, thin, rectangular, chemiluminescent device comprised of a back sheet of a laminated metal foil having heat sealed thereto, at its edges, a bi-component front sheet, the first component of which is a laminated metal foil and the second component of which is a polyolefin sheet, said first and second components being heat sealed to each other at their adjacent latitudinal edge, from about 20% to about 50% of the surface area of said front sheet being comprised of said first component; temporary separation means positioned so as to divide the interior area of said device into two compartments, one under each of said components, the compartment under said second component having positioned therein an absorbent material containing a solvent solution of an oxalate and, optionally, a fluorescer, and the compartment under said first component containing an activator solution.

BRIEF DESCRIPTION OF THE DRAWING

The invention may better be understood by reference to the drawing in which.

DETAILED DESCRIPTION OF THE INVENTION INCLUDING PREFERRED EMBODIMENTS

Figure 1:
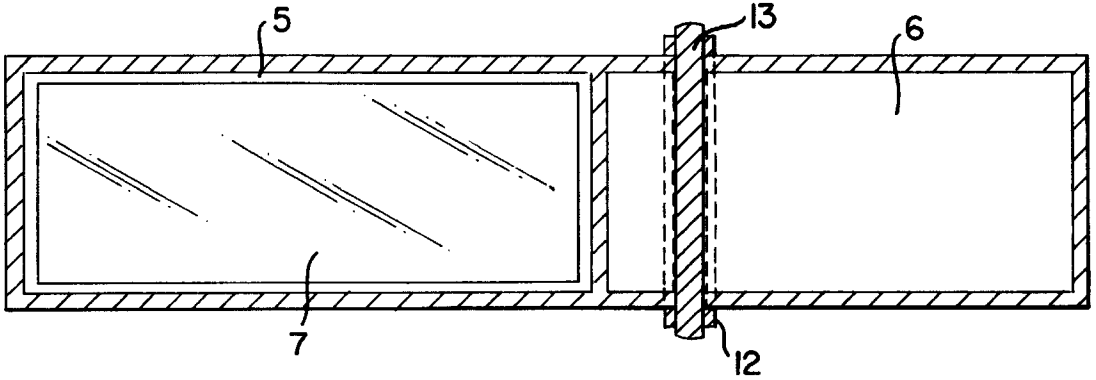
FIG. 1 depicts a top view of the chemiluminescent device.

The majority of commercial chemical lighting devices come in the shape of plastic tubes. Whereas these devices are quite effective from the standpoint of light emission, they are comparatively bulky and, as a consequence of their round cross-section, they tend to emit light in all directions rather than focus it in one direction. Thus, there has been a need to produce chemical light devices which are thin, flat, flexible, stable, easy to handle and emit light in one direction.

Many of the above-described difficulties of chemiluminescent devices have been overcome by the instant invention whereby the activator solution is stored in a compartment which is totally comprised of a metal foil laminate. The metal foil enables the activator solution to retain its activity because it is impermeable.

Additionally, in a preferred embodiment, the absorbent material is composed of a unique polymer structure which enables the material to be used in a thin configuration and to result in a smooth, uniform surface which does not absorb the light generated from the fluorescent reaction.

It is been found that an excellent device results when the absorbent material is positioned in a compartment of the device having a light emitting window with a reflective foil backing and the activator solution is contained in a compartment produced entirely of the same foil as the backing.

The back sheet and the foil member of the bi-component front sheet of the instant invention are both a laminated metal foil, preferably aluminum, which is comprised of, in superimposed relationship, 1) aluminum foil of from about 0.0001 to about 0.002 inch in thickness and 2) low to medium density polyethylene or linear low to medium density polyethylene of from about 0.0005 to about 0.005 inch in thickness.

The low density polyethylene is adhered to the inside of the aluminum foil with an acrylic acid copolymer adhesive.

The resultant aluminum foil laminate imparts to the device of the instant invention: A) low or n permeability of volatile components of the activator solution, B) heat stability, C) no degradation, D) no delamination between the back sheet and the bi-component front sheet. E) non-deteriorating heat sealability, F) stability of chemiluminescent components and G) shelf life. Additionally, the laminate is receptive to self-adhering adhesives.

The total thickness of the aluminum foil laminate ranges from about 0.001 to about 0.01 inch.

The acrylic acid copolymer adhesive is known and generally comprises a copolymer with ethylene. The adhesive contains up to about 10%, by weight, of acrylic acid. It is sold by Dow Chemical Company under the tradename Primacore®. The laminate foil can be prepared by extrusion of a hot layer of the adhesive between the laminate layers, 1) or 2), or extrusion of the adhesive onto the foil followed by extrusion of the layer 2) onto the adhesive coated foil or by mixing the acrylic acid copolymer adhesive and the layer 3) in molten form and applying the mixture to the foil unifomly over its surface.

The side of the foil opposite that having the polyethylene thereon may contain a strength-imparting coating thereon such as oriented polyethylene, nylon etc. or may be decorated, printed on etc.

The bi-component front sheet is produced from a first component comprising a polyolefin resin such as transparent or translucent polyethylene, polypropylene etc. and a second component comprising the same aluminum foil laminate as the back sheet. The two components of the front sheet are heat sealed together at their adjacent latitudinal edges. The aluminum foil laminate comprises from about 20% to about 50% of the total surface area of the front sheet. The front sheet is from about 0.001 to about 0.01 inch in thickness.

Although it is preferred that the device be formed by heat scaling its various components together, it is also possible to form the device by sonic welding and the like.

The device is separated into two compartments by the use of a temporary separation means such as rupturable seal, a clamp, a tight fold etc., the main purpose of the separating means being to separate the chemiluminescent chemicals which, when combined, form chemical light. The preferred means is a clamp such as shown in the attached drawings, and as is known in the art.

The backside of the back sheet preferably has a self-adhering adhesive layer applied thereto so as to enable the device to be adhered to any substrate or to itself in a wrap-around fashion.

As mentioned above, the compartment below the front sheet component composed of the polyolefin has positioned therein an absorbent material such as sponge, pad, mat, porous polymer etc. so as to absorb the chemiluminescent oxalate solution which comprises a solvent solution of an oxalate and, optionally, a fluorescer, and also to absorb the activator solution which is released from the second compartment upon activation of the device. Although any such absorbent material may be used, a most preferred material is that disclosed and claimed in copending application, Ser. No. 07/612,844), filed concurrently herewith. The most preferred material is a porous, flexible[, plasticized] structure comprising A) a non-particulate phase comprising a vinyl halide or vinylidene halide polymer having a molecular weight of about 100,000 to about 500,000 which constitutes about 0.5 to about 15.0 weight percent of [the structure] *total polymer,* B) an agglomerated particle phase comprising either 1) about 85.0 to about 99.5 weight percent *of total polymer* of vinyl halide or vinylidene halide polymer particles having a diameter of from about 25 to about 125 microns and a molecular weight of from about 50,000 to about 120,000, or mixtures of said particles, or 2) about 45 to about 98.5 weight percent *of total polymer* vinyl halide or vinylidene halide polymer particles having a diameter of from about 25 to about 125 microns and a molecular weight of from about 50,000 to about 120,000, or mixtures of said particles and about 1 to about 40 weight percent *of total polymer* of of vinyl halide or vinylidene *halide* polymer particles having a diameter of from about 130 to about 225 microns and a molecular weight of from about 100,000 to about 225,000 and C) a plasticizer comprising a solvent solution of a chemiluminescent compound and, optionally, a fluorescer, dispersed throughout both said phases.

The vinyl halide or vinylidene halide polymers useful in the production of these structures are well known in the art. They include polyvinyl halides such as polyvinyl chloride and polyvinyl fluoride; polyvinylidene halides such as polyvinylidene chloride and polyvinylidene fluoride; copolymers of vinyl halides and/or vinylidene halides with hydrocarbons such as ethylene, propylene etc. in amounts of up to about 25%, by weight, based on the total weight of polymer preferably 5%–15%, by weight, same basis; copolymers of vinyl halides such as vinyl chloride/vinyl fluoride copolymers; copolymers of vinylidene halides such as vinylidene chloride and vinylidene fluoride; copolymers of vinyl halides and vinylidene halides such as vinyl chloride and vinylidene chloride; terpolymers of vinyl halides and vinylidene halides such as terpolymers of vinyl chloride, vinyl fluoride and vinylidene chloride; mixtures of the above vinyl halide polymers and vinylidene halide polymers; mixtures of vinyl halide or vinylidene halide polymers and hydrocarbon polymers such polyvinyl chloride and polyethylene m amount up to about 25%, by weight, based on the total weight of polymers, of hydrocarbon polymer, preferably about 5%–15%, be weight, same basis.

Homopolymers and copolymers of vinyl chloride are preferred.

Useful plasticizer solvents are selected from dialkyl esters of phthalic acid, ethylene glycol ethers, citric acid esters or alkyl benzoates such as ethyl benzoate, butyl benzoate etc. and are present in amounts of from about 0.5 parts to about 3.0 parts of plasticizer per part of vinyl halide or vinylidene halide polymer. A preferred plasticizer solvent is dibutyl phthtalate and it is preferably used in a ratio of about 1.4 part to about 1.0 part of polymer.

Useful chemiluminescent compounds are selected from 3-aminophthalhydrazide, 2,4,5-triphenylimidazole, 10,10'-dialkyl-9,9'-biacridinium salts 9-chiorocarbonyl-10-methylacridinium chloride, and bis(substituted-phenyl) oxalate is bis(2-nitrophenyl) oxalate, bis(2,4-dinitrophenyl) oxalates. Useful oxalates include those such bis(2,6-dichloro-4-nitrophenyl) oxalate, bis(2,4,6-trichlorophenyl) oxalate, bis(3 -trifluoromethyl-4-nitrophenyl) oxalate, bis(2-methyl- 4,6-dinitrophenyl) oxalate, bis(1,2-dimethyl-4,6 -dinitrophenyl) oxalate, bis(2,4-dichlorophenyl) oxalate, bis(2,5 -dinitrophenyl) oxalate, bis(2-formyl-4-nitrophenyl) oxalate, bis(pentachlorophenyl) oxalate, bis(1,2-dihydro-2 oxo-1-pyridyl) glyoxal, bis-N-phthalmidyl oxalate, bis(2,4,5-trichloro-6-carbopentoxyphenyl) oxalate, bis(2,4,5-trichloro-6-carbobutoxyphenyi) oxalate or bis(2,4,6-trichlorophenyl) oxalate, bis(2,4,5-trichloro-6 carbopentoxyphenyl) oxalate, bis(2,4,5-trichloro-6 -carbobutoxyphenyl) oxalate and bis(2,4,6-trichlorophenyl) oxalate. The chemiluminescent compound is added as a solution with the plasticizer solvent during the production of the structure, and is present in an amount of about 10 weight percent to about 15 weight percent of the plasticizer solution. The preferred chemiluminescent compound is bis(2,4,5-trichloro-6-carbopentoxyphenyl) oxalate at about a 12% concentration in the plasticizer solvent, preferably dibutylphthalate.

Useful fluorescers are the substituted anthracenes such as 9,10-bisphenylethynylanthracene, 1 -chloro9,10-bisphenylethynylanthracene or 2-chloro-9,10 -bis(paramethoxyphenyl)anthracene and are used at a concentration of about 0.1 weight percent to about 2.0 weight percent, preferably about 0.1 weight percent to about 0.3 weight percent, of the plasticizer solution, and is preferably added therewith during the preparation of the structure.

The structures discussed above are prepared by a process which comprises forming a uniform slurry of the resin particles in a plasticizer, forming the slurry into a shape and hating the shaped slurry to a temperature of from about 80° C. to about 150° C. for from about 5 to about 50 minutes.

A preferred process of making the structures wherein a small portion, i.e. from about 0.5 to about 3.0 weight percent of vinyl halide or vinylidene halide polymer particles are first slurried alone in the plasticizer, optionally, containing the fluorescer, and the slurry is heated from about 80° C. to about 150° C. for about 5 minutes to about 20 minutes to obtain a solution to which the remaining vinyl halide or vinylidene halide polymer particles are added and mixed to form the uniform slurry. The uniform slurry is then formed, preferably into sheets of about 0.1 mm to about 10 mm in thickness, preferably about 1.0mm to about 3.0 mm in 10 thickness, and said sheets are then heated to about 80° to about 150° C. for about 5 minutes to about 50 minutes, preferably at about 110° C.–130° C. for about 10–40 minutes or such that excess fusion does not occur.

The structure may be shaped, for example, by casting, molding, extruding or blow molding the slurry, etc.

The desirable characteristics of the chemiluminescent polymer structures are the following:

(1) Reasonable strength and flexibility.

(2) Good absorptivity so the chemiluminescent reaction can be initiated by contacting the PVC structure with an activator solution. halides such as vinyl chloride/vinyl fluoride copolymers;

(3) Uniform surface appearance.

(4) The structure must not interfere with the chemiluminescent reaction.

(5) Good shelf-life.

(6) The chemiluminescent structure should be translucent.

These properties of the polymer structure are determined in large part by the following factors:

(1) The amount of chemiluminescent solution absorbed into the polymer structure.

(2) The particles size distribution and molecular weight distribution of the polymer particles used.

(3) The rate of heating and the heating time employed during curing.

(4) The amount of polymer that becomes dissolved into the chemiluminescent solution.

The structures contain one or more components of the chemiluminescent reaction. The components of the chemiluminescent reaction are incorporated into the structure by any number of means but the preferred method is to dissolve the components of the chemiluminescent reaction in a solvent that swells the vinyl halide or vinylidene halide polymer, and the preferred solvent for this process is dibutylphthalate. The amount of chemiluminescent solution used to swell the polymer varies between about 5 and 90 weight percent; the preferred amount is between about 25 and 80 weight percent, most preferably, about 55–60 weight percent. Any chemiluminescent reaction that is compatible with the matrix material of the sheet may be used; the preferred chemiluminescent reaction being the peroxy-oxalate reaction with the preferred oxalate ester being a carbopentoxyphenyloxalate. Preferred fluorescers for this chemiluminescent reaction are substituted anthracenes. The structure is capable of absorbing an activator in order to start the chemiluminescent reaction. It is necessary for the structure to absorb at least one equivalent of the activator solution, but it is preferred that the structure absorb three equivalents of the activator solution. Alternatively, the components of the chemiluminescent reaction can be incorporated into the structure after the structure is formed by absorbing the components into the pores of the structure by merely soaking the structure in a solution of the component.

In order to prepare an absorptive, porous, flexible, strong vinyl halide or vinylidene halide polymer structure with good surface appearance, it has been found that a mixture of two, or preferably three, vinyl halide or vinylidene halide polymer powders selected from fine, medium and large particle size powders, where at least one of the powders is a fine particle powder, is required. Major deviations from the above described process yields structures that are not capable of effectively absorbing activator solution or are physically not acceptable i.e. they are flaky or too fused to be useful.

Figure 2:
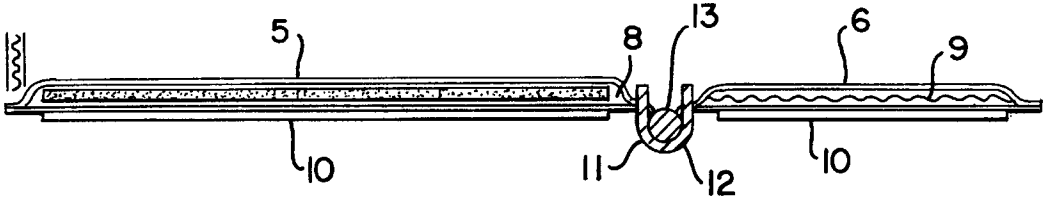
FIG. 2 depicts a side view of the chemiluminescent device showing the absorbent material under the clear side of the top layer, a clamp as the temporary separator and the activator solution in the second compartment.
Figure 3:
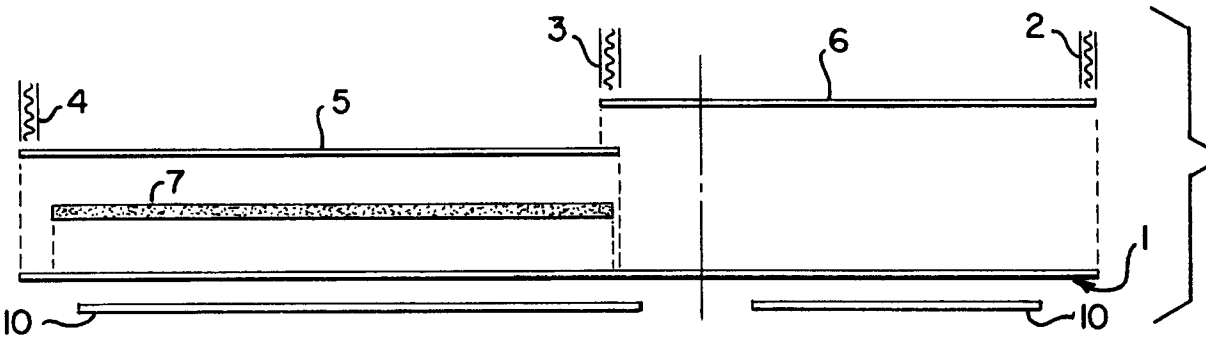
FIG. 3 depicts an exploded side view of the chemiluminescent device.

With reference to the drawing, specifically FIG. 3, the exploded view, the laminated aluminum foil back sheet 1 is heat sealed at points 2,3 and 4 to the front sheet which comprises a bi-component configuration of sheet 5 and another sheet 6 of the laminated aluminum foil. An absorbent material 7 is positioned between sheets 1 and 5, which, when consolidated form compartment 8, whereas compartment 9 is formed when the device is formed by consolidating sheets 1 and 6. Compartment 9 is shown containing activator solution. Adhesive layers 10 are positioned on the reverse side of layer 1 and are protected from damage or premature adhesion by peel-off covering sheets. Clamp 11 is shown as the compartment separating means and is comprised of a receptive member 12 and a pin 13 which 25 is held into member 12 by friction as best seen in FIG. 2. FIG. 1 shows the areas of heat sealing by cross-hatching.

The following examples are set forth for purposes of illustration only and are not to be construed as limitations on the present invention except as set forth in the appended claims. All parts and percentages are by weight unless otherwise specified.

The following abbreviations are sometimes used to indicate chemical structures, analytical tests and other repeatedly used items.

PVC: Polyvinyl Chloride

Fine Particle PVC: A dusty, white powder of medium viscosity PVC resin having a molecular weight of about 303,000 and an average particle size of 0.20–1.5 microns.

Medium Particle PVC: A white powder of PVC resin produced by mass polymerization having a molecular weight of about 98,000 and an average particle size of 70–75 microns.

Large Particle PVC: A white powder of PVC resin having a molecular weight of about 205,000 and an average particle size of 150 microns.

CPPO: Bis(2,4,5-trichloro-6-carbopentoxyphenyl) oxalate, the oxalate ester used in the chemical light reaction.

BPEA: The fluorescer used in the green chemical light reaction is 9,10-bis(phenylethynylanthracene).

CBPEA: The fluorescer used in the yellow oxalate solution is 1-chloro-9,10-bis(phenylethynylanthracene).

BPEN: The fluorescer used in the blue oxalate solution is 2-chloro-9,10-bis(p-methoxyphenyl) anthracene.

Activator: A dimethylphthalate solution of hydrogen peroxide and sodium salicylate.

Spotmeter: Instrument used to measure the light output intensity of a chemical light reaction over time. This instrument is made by Kollmorgen Corporation, Model UBDl/4.

TLOP: Total light output.

Glow Time: The time required to emit 90% of the total light generated by the structure.

LDPE: Low density polyethylene.

OPP: Oriented polypropylene.

EAA: Ethylene/acrylic acid copolymer (90/10)

LLDPE: Linear, low density polyethylene

TOTAL LIGHT OUTPUT MEASUREMENTS

The following method is the standard test used herein for measuring total light outputs of samples. The sample is prepared and cut into 1"×2½" pieces. These test pieces are placed inside 1⅜"× 3¾", 1.5 mil thick, polypropylene bags. The openings of these bags are then heat sealed just above the contained sample, leaving a tab of polypropylene at what was the open end of the polypropylene bag for hanging it in front of the spotmeter. The test pieces are activated by injecting the activator solution into the polypropylene bags with a syringe. The mount of activator used depends on the thickness of the sample. Usually 1.5 ml. of activator is required for a 3–4mm thick sample. The bags are hung vertically during testing and the syringe needle is inserted into the bag near the top.

The spotmeter is focused on the center of the bag at a distance of three inches to one foot. Up to eight samples can be tested simultaneously by placing them on an eight position carousel holder. The carousel and spotmeter are under computer control allowing for both data acquisition and control of the sample positioned in front of the spotmeter.

The samples are activated 10 sec. apart and the data acquisition started 2 min. after the first sample is activated. The computer is set to change samples every 10 sec. The run duration and maximum spotmeter scale depend on the concentration of catalyst in the activator solution. The usual settings for activator containing 0.0043, weight percent, sodium salicylate catalyst are 6 hr. duration and 0–199 ft. lm (a spotmeter setting of $10^1$ for green and yellow test samples, and a spotmeter setting of 100 for blue test samples).

The surface appearance while glowing, as well as, the total light output, the glow time, the mechanical strength, and the absorptivity must be considered in the optimization of a chemiluminescent product. Variations in catalyst concentration in the activator solution cause the glow time of activated structures to vary between 30 min. and 6 hr. The best light outputs are obtained at glow times of about 4 hr. Activation of the structures requires about 0.2–0.25 part of activator solution per pan of structure. The brightness of the structure depends on its thickness. Without a reflective support, the brightness increases with increasing thickness. The brightness of a thick structure can be duplicated with a thinner structure that has a reflective backing. A good working thickness is about 3–4mm with a reflective backing facing the front of the structure.

EXAMPLE

OXALATE SOLUTION PREPARATION

Dibutylphthalate (864 parts) is added to a suitable dry vessel that has been purged with nitrogen and fired with an overhead stirrer, thermocouple thermometer, nitrogen inlet adapter and heating mantle. This solvent charge is heated to 50° C. Fluorescer is added and the mixture is stirred for 30 min. while the temperature is maintained at 50° C. CPPO (133 parts) is added and the solution is stirred at 50° C. for an additional 2 hours. The mixture is allowed to cool to room temperature and filtered under a nitrogen atmosphere through a medium frit sintered glass funnel.

The oxalate formuations for application in the structures are shown in the table below.

| Color | Formulations |
|---|---|
| Blue | 12 wt % CPPO 0.2 wt % BPEN |
| Green | 12 wt % CPPO 0.15 wt % BPEA |
| Yellow | 12 wt % CPPO 0.25 wt % CBPEA |

The amounts of the fluorescers and CPPO are adjusted to take into account the relative purities of the materials so that the active components of the oxalate solution will be present in the amounts shown in the table above.

EXAMPLE 1

LAMINATED ALUMINUM FOILS

The following foils are prepared and tested. The layers of the laminates are listed wherein, when formed into a device in accordance with this invention, the first listed material becomes the outer layer of the device and the last listed layer is on the inside of the device. Test results are listed with each foil laminate.

| | Structure |
|---|---|
| Laminate 1 | 75 gauge OPP (oriented polypropylene) (0.00075") optional strength imparting<br>1.5 lb/3000 sq. ft. Lamal white adhesive (0.0001")<br>Al foil (0.00035")<br>10 lb/3000 sq. ft. EAA (Primacor ® 3440) (0.00067")<br>LDPE (0.001")<br>TOTAL THICKNESS = 0.0029" |

Optimized Sealing Conditions

Before exposure to activator, the heat seal peel force is 7 lbs. per linear inch when sealed with 1.0 sec. impulse heating, 2.5 sec. cooling, and 30 psig pressure on seal area during sealing. After exposure to activator overnight at room temperature, the heat seal peel force is 4 lbs. per linear inch when sealed with 0.5 sec. impulse heating, 2.0 sec. cooling, and 30 psig pressure on seal area during sealing. These are optimized sealing conditions.

Delamination Testing

Sealing conditions are 0.8 sec. impulse heating, 2 sec cooling, and 20 psig pressure on seal area during sealing. After 31 days at 140° F. and at 150° F. no signs of blistering or delamination are noted.

Sealing Strength

Sealing conditions are 0.8 sec. Impulse heating, 2 sec. cooling, and 20 psig pressure on seal area during sealing Seal peel strength before exposure to activator is 7.3 lbs. per linear inch. Seal peel strength after exposure to activator overnight at room temperature is 4.0 lbs. per linear inch.

Burst Test on 2"×3" Bags

Sealing conditions used are 0.8 sec. impulse heating, 2 sec. cooling, and 20 psig pressure on seal area during sealing. Bags burst at 18.6 psig, no exposure to activator. Foil laminate fails; heat seal does not fail. Bags burst at 18.3 psig, after exposure to activator overnight at room temperature. Heat seal does not fail; foil laminate fails inside of heat seal. Bags burst at 15 psig after 31 days exposure to activator at 140° F. and at 150° F.

Results

This laminate passes all stringent tests.

| STRUCTURE | |
|---|---|
| Laminate 2 | 48 gauge PE (polyester) (0.00048") for strength<br>1.5 lb/3000 sq. ft. adhesive (0.0001")<br>Al foil (0.00035")<br>10 lb/3000 sq. ft. EAA (Primacor ® 3440) (0.0067")<br>LLDPE (linear low density polyethylene) (0.0025")<br>TOTAL THICKNESS = 0.0041" |

Optimum Sealing Conditions 1.0 sec. inpulse heating, 1.5 sec. cooling, and 20 psig pressure on seal area during sealing.

Delamination Testing

Optimum conditions are used. Delimination is noted on these samples after 4 days at 140° F. and 150° F. Delamination occurs by separation of the polyethylene heat seal layer from the Primacor® layer.

Sealing Strength

Optimum sealing conditions are used. Seal peel strength before exposure to activator is 19.2 lbs. per linear inch. Seal peel strength after exposure to activator overnight at room temperature is 14.8 lbs. per linear inch.

Burst Test on 2"×3" Bags

Optimun sealing conditions are used. Bags burst at 41.2 psig before exposure to activator. Bags burst at 34 psig (140° F.) and at 43 psig (150° F.) after exposure to activator for 6 days at their test temperatures.

Results

This laminate is deficient in that it delaminates after 4 days in activator solution.

| STRUCTURE | |
|---|---|
| Laminate 3 | 60 gauge Nylon (0.0006") for strength<br>LDPE (0.00125")<br>Al foil (0.00035")<br>LDPE (0.00325")<br>TOTAL THICKNESS = 0.00055" |

Delamination Testing

Some signals of delamination after one day at 110° F. Complete delamination after 14 days at 110° F. Complete delamination after one date at 150° F.

Burst Test on 2"×3" Bags

Bags are sealed for this test as follows: 1 25 sec. impulse heating, 5 sec. cooling and 40 psig pressure on seal area during sealing. Bags burst at an average value of 46.4 psig prior to exposure to activator solution. Bags burst at an average of 13.2 psig after exposure to activator solution overnight at room temperature.

Results

This laminate fails by delamination.

| STRUCTURE | |
|---|---|
| Laminate 4 | 48 gauge polyester (0.0048") for strength<br>Al foil (0.00035")<br>4 lb/3000 sq. ft. Primacor ® 3440 (0.00027")<br>18 lb/3000 sq. ft. LDPE (0.0012")<br>TOTAL THICKNESS = 0.0023"<br>NOTE: The Primacor ® and the LDPE are coextruded. |

Delamination Testing

Sealing conditions are 1.25 sec. impulse heating, 5.0 sec. cool, 44 psig pressure on the seal area during sealing. Blisters after 25 days at 150° F. No delamination after 61 days at 150° F.

Sealing Strength 1.4 sec. impulse heating, 5.0 sec. cool, 40 psig pressure on the seal during sealing. Peel strength=5.5 lbs. per linear inch (no exposure to activator)

Laminate Peel 1.1 lbs. per liner inch (no exposure to activator)

50,000 ft. Exposure

Fails at 47 and 54 days; passes at 61 days.

Results

This laminate is unacceptable. The seal fails after exposure to activator solution.

| STRUCTURE | |
|---|---|
| Laminate 5: | 100 gauge biaxially oriented Nylon (0.001") for strength<br>7 lb/3000 sq. ft LDPE adhesive (0.00047")<br>Al foil (0.00035")<br>4 lb/3000 sq. ft. Primacor ® 3440 (0.00027")<br>18 lb/3000 sq. ft. LDPE (0.00012")<br>TOTAL THICKNESS = (0.00033")<br>NOTE: The Primacor ® and LDPE are coextruded. |

Optimized Sealing Conditions 1.5 sec. impulse heating, 4.0 sec. cooling, 30 psig pressure no seal area during sealing.

Delamination Testing

Sealing conditions are 1.25 sec. impulse heating, 5.0 sec. cooling, 40 psig pressure on seal area during sealing. Blistering does not occur after 60 days at 150° F. No delamination after 64 days at 150° F.

Sealing Strength

Uses optimized sealing conditions. Seal peel strength before exposure to activator is 7.1 lbs. per linear inch. Seal peel strength after exposure to activator at room temperature overnight 0.8 lbs. per linear inch.

Laminate Peel 0.75 lbs. per linear inch (no exposure to activator).

50,000 Ft. Exposure

Shows variable results in that it fails at 51 days, but passes at 35, 59, and 64 days.

Burst Test on 2"×3" Bags

Uses optimized sealing conditions. Bags burst at 22.7 psig. no exposure to activator. Laminate fails at inside edge of seal. Bags burst from failure in seal at 5.0 psig after exposure to activator at room temperature overnight.

Results

This laminate also fails by heat seal degradation upon contact with activator solution.

EXAMPLE 2

A chemiluminescent device is assembled in the following manner: A 4⅞ inch×2 inch transparent polyethylene sheet is heat sealed on one end (with a ⅛ inch overlap for the heat seal) to a 3⅞ inch×2 inch section of Laminate 1 sheet, as described in Example 1. The resultant 8½ inch×2 inch sheet is then sealed at the top and bottom lengthwise edges to a 8½ inch× 2 inch sheet of Laminate 1 whereby an elongated open tube is formed with ⅛ inch heat seals on each edge and wherein in the low density polyethylene (LDPE) layer of the foil laminate is on the inside of the tube, both for the back and front sheets of the tube. On the back of the tube is placed an adhesive backing covered with release paper.

Into the end of the tube containing the clear polyethylene front sheet is placed an absorbant material that is 1 5/16"× 4½"×3 mm in size containing oxalate and yellow fluorescer. The end of the tube is sealed with a ⅛ inch heat seal. The absorbent material is retained in place by placing a compression seal clip and pin across the portion of the tube in which both the front and back sheets are foil laminate at a distance of 3⅛ inch in from the remaining open end. Into the remaining portion of the tube is placed 3.5 ml. of activator solution. The end of the tube is closed with a 1 inch heat seal. In so doing, the activator solution is enclosed in a pouch that is composed completely of foil laminate. The compression seal clip and pin completely prevent mixing of the activator with the absorbant material until such time as the compression seal is released.

Activation of the resultant device creates a total light output of 61.6 ft.-lam.-hrs. The light piece has the advantage of being a flat, flexible, stable light source that can be attached to most solid surfaces and is useful as a chemical light source. No degradation of the activator solution of a similar non-activated device occurs after months of unprotected storage.

EXAMPLE 3

Fine particle size PVC is sifted through a fine wire screen to remove large particles. The fine particle size PVC (10 parts) is then thoroughly mixed with a small mount of the oxalate solution of Example A to form a thick paste. The thick paste is slowly added to the remainder of 268 parts of the oxalate solution with vigorous agitation. A nitrogen atmosphere is maintained over the slurry so as to protect it from atmospheric moisture and the slurry is heated rapidly to 100° C.–110° C. in about 5–10 minutes and maintained at this temperature for 10–15 minutes. The PVC dissolves and the resultant solution becomes more viscous. The solution is cooled to 50° C.–60° C. and 270 parts of oxalate are added with stirring. 288 Parts of medium particle size PVC and 86.1 parts of large particle size PVC are added through a powder funnel. The slurry becomes very thick and is stirred manually with a spatula into a smooth mixture.

90 Parts of the mixture are poured into a 5×8 inch glass-bottomed form, heated in an oven at 110° C.– 120° C. for 10 minutes, removed from the oven and allowed to cool to room temperature. The cooled structure is easily pealed from the form and cut into samples for testing. The structure is about 4mm thick. Addition of the activator solution of Example B, below, results in the production of chemiluminescent light.

EXAMPLE B

ACTIVATOR SOLUTION

An activator solution is prepared by stirring together 81.4 parts of dimethyl phthalate, 13.3 parts of t-butyl alcohol, 5.29 parts of 90% aqueous hydrogen. peroxide and 0.043 part of sodium salicylate until complete solution occurs.

EXAMPLE 4

Structures are prepared by slurrying together 14 parts of oxalate solution and varying amounts of fluorescer with 10 parts of a PVC particle mixture of 2.0 parts of large particle PVC, 7.5 parts of medium particle PVC and 0.5 part of fine particle PVC. Each slurry is baked in an oven at 120° C. for 10 minutes, and the result structure is cooled to room temperature and cut into 1×3 inch strips which are then sealed in polypropylene bags. The structures are activated by injecting 1.6 parts of activator solution of Example B into the bag and mixing. The activated structures in the bags are placed in front a spotmeter at a distance of 3 inches. Data is collected beginning two minutes after activation. The results are set forth in Table I, below.

TABLE I

| COLOR | FLUORESCER (WT %) | TLOP (FT-L-HR) |
|---|---|---|
| YELLOW | 0.25 | 71.1 |
| YELLOW | 0.30 | 67.9 |
| YELLOW | 0.35 | 73.5 |
| GREEN | 0.15 | 47.9 |
| GREEN | 0.20 | 46.3 |
| BLUE | 0.07 | 7.09 |
| BLUE | 0.11 | 8.87 |
| BLUE | 0.14 | 9.40 |
| BLUE | 0.20 | 10.06 |
| BLUE | 0.25 | 13.51 |

EXAMPLE 5

TLOP VS CPPO CONCENTRATION

Structures are prepared as described in Example 4. The oxalate solutions used in this example contain varying amounts of CPPO. The fluorescer concentrations are 0.1 weight percent BPEN for the blue oxalate, 0.11 weight percent BPEA for the green oxalate, and 0.26 weight percent CBPEA for the yellow oxalate. The structures are activated and the TLOP measured, as described above. The results are shown in Table II, below.

TABLE II

| COLOR | CPPO (WT %) | TLOP (FT-L-HR) |
|---|---|---|
| YELLOW | 8 | 39.6 |
| YELLOW | 11 | 46.2 |
| YELLOW | 15* | 71.1 |
| YELLOW | 17 | 66.8 |
| GREEN | 4 | 8.98 |
| GREEN | 7.8 | 15.2 |
| GREEN | 12 | 27.4 |
| GREEN | 15* | 26.2 |
| BLUE | 3.7 | 2.35 |
| BLUE | 7.7 | 6.47 |
| BLUE | 11.7 | 8.87 |
| BLUE | 14.2* | 7.80 |

*The CPPO slowly precipitates out of this oxalate solution.

EXAMPLE 6

TLOP VS OXALATE:PVC RATIO

Structures are prepared by slurrying together vary ing mounts of yellow fluorescer oxalate solution with PVC powder (10 parts) directly in a suitable vessel. The PVC powder mixture is composed of large particle size 20 PVC (2.0 parts), medium particle size (7.5 parts) and fine particle size PVC (0.5 part). These slurries are baked in an oven at 120° C. for 10 min. The baked PVC is cooled and cut into 1×3 inch strips which then are sealed in polypropylene bags. The strips are activated by injecting 1.6 parts of activator into the polypropylene bag. The bags are placed in front of the spotmeter at a distance of 3 inches. Data collection from the spotmeter is begun 2 min. after activation. The results of this study are shown in Table III, below.

The light output increases and then levels off at a ratio of about 1.4:1. The structure is strong and does not crumble during or after the baking stage of the preparation. When lower oxalate/PVC ratios are employed, the resultant structures are flaky and cannot be handled. Higher oxalate/PVC ratios result in structures that are over plasticized and not very absorptive of the activator solution.

TABLE III

| ACTIVATOR (PARTS) | OXALATE/PVC RATIO (WT:WT) | TLOP (FT-L-HR) |
|---|---|---|
| 9 | 0.9:1 | 28.2 |
| 10 | 1.0:0 | 29.2 |
| 11 | 1.1:1 | 31.1 |
| 12 | 1.2:1 | 30.8 |
| 13 | 1.3:1 | 34.8 |
| 14 | 1.4:1 | 40.7 |
| 15 | 1.5:1 | 38.6 |
| 17 | 1.7:1 | 38.9 |

EXAMPLE 7

TLOP VS STL THICKNESS

Structures are prepared from yellow fluorescer oxalate solutions as described in Example 3. The thickness of the structures is controlled by using molds of different area and varying the mount of slurry used. The molds, weights of slurry used, and the resulting thickness of the structures after baking are shown in Table IV.

TABLE IV

| SLURRY WEIGHT (PARTS) | MOLD | THICKNESS (MM) |
|---|---|---|
| 10 | 90 mm dish | 1.3 |
| 45 | 5 × 8 inch | 1.9 |
| 15 | 90 mm dish | 2.3 |
| 67.5 | 5 × 8 inch | 2.9 |
| 20 | 90 mm dish | 3.4 |
| 90 | 5 × 9 inch | 3.7 |
| 25 | 90 mm dish | 4.2 |
| 35 | 90 mm dish | 5.1 |
| 40 | 90 mm dish | 7.0 |

The structures are cut into 1×2½ inch pieces, activated with the activator solution of Example B, and their TLOP measured. The mount of activator used in proportion to the thickness of the structure. The results are shown in Table V.

TABLE V

| STL PAD THICKNESS (MM) | BRIGHTNESS (FT-L) | TLOP (FT-L-HR) |
|---|---|---|
| 1.9 | 57.5 | 36.0 |
| 2.9 | 68.1 | 41.4 |
| 3.4 | 59.0 | 44.4 |
| 3.7 | — | 56.0 |
| 4.2 | 62.6 | 51.9 |
| 5.1 | 69.6 | 66.6 |
| 7.0 | 93.3 | 78.8 |

The TLOP of the structures is also measured for those of the same thickness; with and without reflective aluminum foil backing. The results are shown in Table VI.

TABLE VI

| THICKNESS (MM) | WITH OR WITHOUT FOIL BACKING | BRIGHTNESS (FT-L) | TLOP (FT-L-HR) |
|---|---|---|---|
| 1.9 | with | 70.2 | 46.1 |
| 1.9 | without | 57.5 | 36.0 |
| 2.9 | with | 96.7 | 61.6 |
| 2.9 | without | 68.1 | 41.4 |
| 3.4 | with | 62.1 | 57.1 |
| 3.4 | without | 59.0 | 44.4 |
| 3.7 | with | — | 63.7 |
| 3.7 | without | — | 56.0 |

EXAMPLE 8

CATALYST CONCENTRATION STUDIES

A series of tests is performed on the yellow, green, and blue structures to determine the effect of catalyst concentration in the activator on the TLOP and glow time. The glow time is taken to be the time period from activation until 90% of the possible light output has been given off. The structures are prepared in the same way as those described in Example 3. The 1×2 inch samples are sealed in polypropylene bats and activated by injecting 1.5 ml of the activator into the bag. The catalyst (sodium salicylate-NaSal) concentration in the activator is varied. The light output is measured with the spotmeter at a distance of one foot from the samples. Table VII sets forth the results.

TABLE VII

| Parts NaSal | YELLOW STL TLOP (FT-L-HR) | GLOW TIME |
|---|---|---|
| 0.009 | 57.3 | 436 |
| 0.019 | 64.6 | 267 |
| 0.029 | 63.1 | 158 |
| 0.043 | 57.3 | 95 |
| 0.050 | 57.3 | 85 |
| 0.062 | 48.1 | 65 |
| 0.071 | 41.4 | 57 |
| 0.082 | 40.1 | 44 |
| 0.087 | 39.6 | 39 |
| **Parts NaSal** | **GREEN STL TLOP (FT-L-HR)** | **GLOW TIME** |
| 0.009 | 43.0 | 330 |
| 0.019 | 47.4 | 217 |
| 0.029 | 43.3 | 119 |
| 0.043 | 42.3 | 80 |
| 0.050 | 41.6 | 90 |
| 0.062 | 39.4 | 74 |
| 0.071 | 38.9 | 62 |
| 0.082 | 35.5 | 44 |
| 0.087 | 34.4 | 42 |
| **Parts NaSal** | **BLUE STL TLOP (FT-L-HR)** | **GLOW TIME** |
| 0.009 | 8.6 | 412 |
| 0.019 | 10.0 | 324 |
| 0.029 | 9.4 | 209 |
| 0.043 | 9.3 | 111 |
| 0.050 | 9.1 | 108 |
| 0.062 | 8.2 | 79 |
| 0.071 | 9.5 | 52 |
| 0.082 | 8.6 | 38 |
| 0.087 | 7.6 | 36 |

EXAMPLE 9

ACTIVATOR ABSORPTION STUDIES

Three different oxalate-PVC mixtures are prepared that vary in the mount of fine particle PVC used in the PVC pan of the formulation. Yellow fluorescer-oxalate solution is used in a ratio of 1.4:1 (wt/wt) with the PVC mixtures shown in the following table. 35 PVC Particle Size

| | PVC Particle Size | | |
|---|---|---|---|
| FORMULATION | FINE | MEDIUM | LARGE |
| No. 1 | 2.6 wt % | 75 wt % | 22.4 wt % |
| No. 2 | 3.8 wt % | 75 wt % | 21.2 wt % |
| No. 3 | 5.7 wt % | 75 wt % | 19.3 wt % |

The fine particle PVC is dissolved in the oxalate 45 solution at 100° C. The resultant solution is cooled to room temperature and the remaining medium and large PVC is added. Portions of 24 parts of these slumes are poured into molds and baked in an oven at 120°0 C. for 10 min. The resulting structures are cooled and cut into 1 inch squares. The dry weights of these squares are recorded. These samples are placed in a vessel containing activator solution at room temperature. The weight gain of these samples is taken at 1,2,3,5, and 10 min. intervals. The results are shown on Table VIII titled Activator Absorption where pans of activator absorbed per part of sample is measured against time. The standard commercial chemical lightstick contains 2.8 parts of activator and 7.8 parts of oxalate solution. On a weight of active chemical basis, this corresponds to the absorption of 0.21 part of activator per part of sample. It can be seen from Table VIII that the samples obtained from PVC formulation No. 1 absorb the required mount of activator in about 2 min. The other formulations, No. 2 and No. 3, do not absorb the needed amount of activator.

TABLE VIII

| ACTIVATOR ABSORPTION | | | | | |
|---|---|---|---|---|---|
| No. 1 2.6% Fine PVC | | No. 2 3.8% Fine PVC | | No. 3 5.7% Fine PVC | |
| Time Min. | Wt. Gain | Time Min. | Wt. Gain | Time Min. | Wt. Gain |
| 1 | 0.13 | 1 | 0.007 | 1 | 0.025 |
| 2 | 0.21 | 2 | 0.09 | 2 | 0.025 |
| 3 | 0.24 | 3 | 0.10 | 3 | 0.027 |
| 5 | 0.25 | 5 | 0.11 | 5 | 0.030 |

EXAMPLE 10

ENVIRONMENTAL MOISTURE EXPOSURE STUDIES

Structures are made by mixing large (13.75 parts), medium (29.7 parts), and fine (2.75 parts) particle PVC, and yellow fluorescer oxalate solution (63.8 parts) in a blender. The resulting slurry is poured into a rectangular-form and baked in an oven at 120° C. for 10 min. The structure is allowed to cool and cut into 1×3 inch strips. Approximately 50 of these test strips are made by repetition of this procedure. These samples are suspended from a "line" in the dark. Also in the dark are approximately 50 open vials containing samples of the same yellow fluorescer oxalate solution used in the preparation of the structures. The temperature and humidity are monitored. The relative humidity averages around 55% and the temperature varies between 20° C.–25° C. The TLOP of the structures and lightsticks made from the oxalate stored in the open vials, are taken about once a week. These light output experiments are conducted by taking a random sample of three of the structures and sealing them in polyethylene bags. These bagged samples are placed three inches in front of the spotmeter and activated by injecting 1.6 ml. of high activator into the bag. Three lightsticks are also prepared from the oxalate solution that was stored in the open vials. These lightsticks are prepared with ampoules of the same activator solution that is used to activate the bagged samples. The amount of oxalate and activator used in these lightsticks is 7.8 parts and 2.8 parts, respectively. The lightsticks are also placed three inches in front of the spotmeter and data collection is started two minutes after activation. The average TLOP of the three bagged samples and the three light sticks at different exposure times are shown in Table IX, below.

TABLE IX

| EXPOSURE (WEEKS) | TLOP LIGHTSTICK (FT-L-HR) | TLOP STRUCTURE (FT-L-HR) |
|---|---|---|
| 0 | 111.3 | 43.2 |
| 1 | 100.1 | 44.3 |
| 2 | 92.7 | 41.7 |
| 3 | 71.6 | 40.1 |
| 4 | 77.4 | 41.3 |
| 5 | 70.1 | 37.4 |
| 6 | 69.2 | 38.2 |
| 8 | 54.9 | 34.9 |
| 10 | 14.4 | — |
| 12 | 9.7 | 18.7 |

It is apparent that the light output of the PVC structure samples decays more slowly than the light output of the exposed oxalate solution. It is necessary, however, to protect the structures with a moisture barrier during storage in order to maintain their shelf life.

EXAMPLE 11

FLUORESCENT LIGHT EXPOSURE STUDIES

Yellow light emitting structures are prepared from oxalate containing 12 parts of CPPO end 0.25 part of CBPEA. Green light emitting structures are prepared from oxylate containing 12 parts of CPPO and 0.15 part of BPEA and blue light emitting structures are prepared from oxalate containing 12 part of CPPO and 0.2 part of BPEN. The structures used in these tests are cut into 1×2 inch strips and sealed in polypropylene bags. The bagged samples are placed under a fluorescent light fixture fitted with two F40/)CW, cool white, 40 watt, fluorescent lamps mounted 8¼ inches above the samples. The samples are turned over every morning and evening. The average TLOP of three samples is taken succcessively longer time intervals. The samples are placed one foot in front or the soptmeter and activated by injecting 1.5 part of activator into the bag. Table X sets forth the results.

TABLE X

| EXPOSURE TIME (HR) | TLOP (FT-L-HR) |
|---|---|
| YELLOW | |
| 0 | 68.0 |
| 6 | 47.6 |
| 22 | 40.3 |
| 47 | 33.4 |
| 77 | 27.9 |
| 144 | 25.4 |
| GREEN | |
| 0 | 44.7 |
| 6 | 39.8 |
| 24 | 36.7 |
| 48 | 32.9 |
| 72 | 30.1 |
| 168 | 26.4 |
| BLUE | |
| 0 | 8.19 |
| 6 | 8.42 |
| 24 | 7.34 |
| 48 | 7.29 |

EXAMPLE 12 (COMPARATIVE)

ABSORBANCE OF MONOPARTICLE STRUCTURES

This example illustrates the different absorptivities of structures prepared from PVC powder with different particle sizes and different molecular weights. The structures are prepared by slurrying together 10 parts of a dibutylphthalate solution or oxalate ester and fluorescer as in Example 3 with 10 parts or the PVC powder to be tested The resulting slurries are placed in molds and baked in an oven at 120° C. for 10 min. Square pieces are cut from the cooled structures. The weight of the pieces is recorded. The pieces are soaked in activator solution as in from Example 1 until their weight pin is constant. The particle size, average molecular weight, parts of activator absorbed per part of structure and the physical appearance of the structure are shown in Table XI.

TABLE XI

| PARTICLE SIZE | AVERAGE MOLECULAR WEIGHT | PARTS OF ACTIVATOR PER PART OF STRUCTURE | APPEARANCE OF STRUCTURES |
|---|---|---|---|
| 0.2–1.5 microns (A) | 303,000 | 0.05 | tough, highly plasticized |
| 70–75 microns (B) | 98,000 | 0.28 | smooth surface, fragile |
| 120 microns (C) | 104,000 | 0.45 | rough surface, fragile |
| 150 microns (D) | 205,000 | 0.62 | bumpy surface, very fragile |

Larger particle size lives structures that are more porous and absorptive. The highly absorptive structures are crumbly and friable. The less absorptive structures are very tough and flexible. Thus, it is clear that structures of the desired properties do not result when using only single PVC particles regardless of their size or molecular weight as shown in U.S. Pat. No. 3,816,325.

EXAMPLE 13

The following example illustrates the use or combinations of different PVC powders to prepare chemiluminescent structures. In some of these formulations, a portion of the PVC powder is dissolved in the chemiluminescent solution prior to adding the resl of the PVC powder and curing. Four different PVC powders Are used as referred to as A, B, C, and D in Example 12.

Five different formulations are prepared. All or these formulations use the chemiluminescent solution of Example 3. Formulation No. 1 is prepared by dissolving 1.6 parts or PVC powder A in 87.5 parts or the chemiluminescent solution at 100° C. for 15 min. To this cooled solution are added 60.9 parts or PVC powder B. Formulation No. 2 is a slurry of 46.9 or PVC powder B and 15.6 parts or PVC powder D in 87.5 parts or the chemiluminescent solution. Formulation No. 3 is prepared by dissolving 1.6 parts of PVC powder A in 87.5 parts of the chemiluminescent solution at 100° C., for 15 min. To this cooled solution are added 46.9 parts of PVC powder der B and 14 parts of PVC powder C. Formulation No. 4 is prepared by dissolving 20.3 parts of PVC powder A in 1096 parts or the chemiluminescent solution at 100° C. for 15 min. To this cooled solution are added 586 parts of PVC powder B and 175 parts or PVC powder D. Formulation No. 5 is prepared by dissolving 1.6 parts or PVC powder A in 87.5 parts of the chemiluminescent Recent solution at 100° C. for 5 min. To this cooled solution are added 60.9 parts of PVC powder D, A structure is made from each of these formulations by pouring 84.5 parts of slurry into a square mold and curing in an oven at 120° C. for 10 min. The absorbency of each of the resultant structures is measured by soaking a one inch square piece in activator solution until it no longer gains weight. The ratio of the weight gain to the initial weight of the test piece is shown in Table XII, below, along with a description of the physical appearance of the structure.

TABLE XII

| FORMULATION NO. | PARTS OF ACTIVATOR PER PART OF STRUCTURE | APPEARANCE OF SHEET |
|---|---|---|
| 1 | 0.22 | smooth surface, good strength |
| 2C | 0.25 | slurry settles quickly, slightly flaky surface |
| 3 | 0.33 | smooth surface, good strength, can be folded without breaking, slightly stretchy |
| 4 | 0.35 | appearance similar to sheet from formulation No. 3 |
| 5C | 0.68 | poor strength, very flaky surface |

C = Comparative

EXAMPLE 14 (COMPARATIVE)

The following example further illustrates the utility in using a variety of different PVC resins as the dissolved PVC in the formulation. Three different formulations are prepared. All of these formulations use the dubutylphthalate chemiluminescent solution plasticizer of Example 3. Formulation No. 6 is prepared by dispersing 1.6 parts of PVC powder D in 87.5 pans of the chemiluminescent solution. The dispersed PVC powder is dissolved in the chemiluminescent solution by heating to 100° C. for 15 min. After cooling the solution, there are added 46.9 parts of PVC powder B and 14 parts of PVC powder D. Formulation No. 7 is prepared by dissolving 1.6 parts of PVC powder C in 87.5 parts of the chemiluminescent solution, as described above. A slurry of this solution is made by adding 46.9 parts of PVC powder B and 14 parts of PVC powder D. Formulation No. 8 is prepared as described above by dissolving 1.6 parts of PVC powder B in 87.5 parts of the chemiluminescent solution. Again a slurry is made from this solution by adding 46.9 parts of PVC powder B and 14 parts of 35 PVC powder D. A sheet of chemiluminescent material is made from each of these formulations by pouring 84.5 parts of the slurry into a square tray and curing in an oven at 120° C. for 10 min. The absorbency of each of these sheets is measured by soaking a one inch square piece of the sheet in the activator solution until it no longer gains weight. The ratio of the weight gain to the initial weight of the test piece is shown Table XIII, below, plus description of the physical appearance of the structure.

TABLE XIII

| FORMULATION NO. | PARTS OF ACTIVATOR PER PART OF STRUCTURE | APPEARANCE OF STRUCTURE |
|---|---|---|
| 6C | 0.33 | textured (orange peel) surface, strong, stretchy, can be folded double, flaky when cut |
| 7C | 0.37 | smooth surface, breaks when folded double, strong, stretchy, flaky around edges |
| 8C | 0.33 | same as formulation No. 7 |

C = Comparative

Strips (1×3 inch) are cut from the above samples. These strips are sealed in polypropylne bags. The chemiluminescent reaction is started by injecting 1.6 parts of activator solution into the polypropylene bag. The light intensity from these strips is measured with a photometer focused at the center of the strip. The light intensity is integrated over time to give the total light output (TLOP) in units of foot lambert hours. These light outputs are given for each formulation below.

| FORMULATION NO. | TLOP (FT-L-HR) |
|---|---|
| 6 | 31.6663 |
| 7 | 30.3903 |
| 8 | 36.4072 |

EXAMPLE 15

The following example illustrates the results of using mixtures of different types of PVC powders in preparing sheets of chemiluminescent materials. In this example, the PVC powders are simply stirred into a slurry with the chemiluminescent solution. None of the PVC powder is deliberately dissolved into the chemiluminescent solution prior to making the slurry. A variety of different PVC powder mixtures are made from PVC powders A, B, and D of Example 10. These different PVC powders mixtures are slurried with varying amounts of a chemiluminescent solution and baked in an oven at 120° C. for 10 min. The following results are observed.

1) PVC powder A behaves as a binder for the structure. Less than 0.5 weight percent of PVC powder A gives flaky, crumbly structures. Over 15 weight percent of PVC powder A gives very tough structures which are not absorbant. The preferred range is about 0.5 to about 3.0, weight percent.
2) PVC powder B acts as a filler material. It is a moderate binder when not initially dissolved into the chemiluminescent solution, and it is a moderate absorber.
3) PVC powder D is a very good absorbent, but a very poor binder when not initially dissolved into the chemiluminescent solution.

EXAMPLE 16

CURING TIME AND TEMPERATURE

This example illustrates the effects of different curing times and temperatures on the absorptivity and TLOP of the chemiluminescent structure. All are prepared from Formulation No. 4 of Example 13. Table XIV, below, show the curing times, curing temperatures, and physical appearance of the sheet.

TABLE XIV

| TEMP | TIME | APPEARANCE OF SHEET |
|---|---|---|
| 90° C. | 10 min | smooth surface, reasonable strength |
| 90° C. | 15 min | smooth surface, good strength |
| 120° C. | 30 min | smooth surface, strong |
| 150° C. | 5 min | very strong, tough, flexible, slightly over plasticized |
| 150° C. | 10 min | slightly translucent, very strong tough, over plasticized* |
| 150° C. | 20 min | translucent, very strong and strong and tough, highly plasticized* |

* = Comparative

The absorptivities and light outputs are measured for each of these structures by the methods described above. The results of each of these measurements are shown in Table XV, below.

TABLE XV

| TEMP (°C.) | TIME (MIN) | PARTS OF ACTIVATOR PER PART OF STRUCTURES | TLOP (FT-L-HR) |
|---|---|---|---|
| 90 | 10 | 0.27 | 36.3930 |
| 90 | 15 | 0.30 | 34.5938 |
| 90 | 30 | 0.32 | 34.8413 |
| 120 | 10 | 0.35 | 37.8190 |
| 150 | 5 | 0.17 | 22.8411 |
| 150 | 10 | 0.02 | 6.4400 |
| 150 | 20 | 0.02 | 1.6309 |

EXAMPLES 17–26

The procedure of Example 3, unless otherwise specified, is followed except that different polymer formulations are used. The polymers are specified below. In each instance, similar results are observed.

17. Polyvinylidene chloride.
18. Copolymer of vinyl chloride and ethylene (80/20).
19. Copolymer of vinylidene chloride and vinyl fluoride (50/50) (large particles only).
20. Polyvinyl fluoride (fine particles only). (Example 2 procedure followed)
21. Copolymer of vinylidene chloride and propylene (90/10). (Example 4 procedure followed).
22. Copolymer of vinyl chloride and vinyl fluoride (95/5) (medium particles only).
23. Copolymer of vinyl chloride and vinylidene chloride (75/25).
24. Mixture of polyvinylchloride and polyvinylidene chloride (50/50).
25. Terpolymer of vinyl chloride, vinyl fluoride and vinylene chloride (85/10/5).
26. Mixture of vinylene chloride and polyethylene (75/25).

EXAMPLES 27–37

Following the procedure of Example 2, a series of chemiluminescent devices is produced using the structures of the above examples, as indicated, in place of the absorbent material thereof. In each instance, comparable results are achieved.

| Example | Structure of Ex. No. | Comments |
|---|---|---|
| 27 | 3 (Blue Fluorescer) | Even, bright blue light |
| 28 | 4 (Green Fluorescer) | Strong green lumination |
| 29 | 6 | Yellow light; brilliant color; constant |
| 30 | 9 (Formulation No. 1) | Strong, yellow light |
| 31 | 10 | Constant, even glow |
| 32 | 13 (Formulation No. 4) (Blue Fluorescer) | Deep blue light |
| 33 | 18 (Green Fluorescer) | Strong light |
| 34 | 19 (Green Fluorescer) | Strong light |
| 35 | 22 (Green Fluorescer) | Even, medium light |
| 36 | 25 (Green Fluorescer) | Bright, green |
| 37 | 26 (Green Fluorescer) | Good, constant light |

We claim:

1. A flexible, thin, rectangular chemiluminescent device comprised of a back sheet of a laminated metal foil having heat sealed thereto, all its edges a bi-component front sheet, the first component of which is a laminated metal foil capable of preventing the escape of hydrogen peroxide and the second component of which is a light transmitting a polyolefin sheet, said first and second components being heat sealed to each other at their adjacent latitudinal edge, from about 20% to about 50% of the surface area of said front sheet being comprised of said first component; temporary separation means positioned so as to divide the interior area of said device into two compartments, one under each of said components, the compartment under said second component having positioned therein an absorbent material containing a solvent solution of a chemiluminescent compound and, optionally, a fluorescer, and the compartment under said first component containing an activator solution.

2. The device according to claim 1 wherein said separation means comprises a clamp.

3. The device according to claim 1 wherein said absorbent material is a porous, flexible structure comprising A) a non-particulate phase comprising a polyvinylchloride resin having a molecular weight of about 100,000 to about 500,000 which constitutes about 0.5 to about [3.0] *15.0* weight percent [the structure] *total resin,* B) an agglomerated particle phase comprising either 1) about 85 to about 99.5 weight percent *of total resin* of polyvinylchloride resin particles having a diameter of from about 25 to about 125 microns and a molecular weight of from about 50,000 to about 120,000, or mixtures of said particles, or 2) about [40] *45* to about 98.5 weight percent *of total resin* of polyvinylchloride resin particles having a diameter of from about 25 to about 125 microns and a molecular weight of from about 50,000 to about 120,000, or mixtures of said particles, and about to about 40 weight percent *of total resin* of polyvinylchloride resin particles having a diameter about 130 to about 225 microns and a molecular weight of from about 100,000 to about 225,000 and C) a plasticizer comprising a solvent solution of a chemiluminescent compound and, optionally, a fluorescer, dispersed throughout both said phases.

4. A structure according to claim 3 wherein said agglomerated particle phase constitute polyvinylchloride particles having a diameter of from about 25 to about 125 microns and a molecular weight of from about 50,000 to about 120,000, or mixtures of said particles.

5. A structure according to claim 3 wherein said agglomerated particle phase constitutes polyvinylchloride resin particles having a diameter of from about 25 to about 125 microns and a molecular weight of from about 50,000 to about 20,000, or mixtures of said particles and polyvinyichloride resin particles having a diameter of from about 130 to about 225 microns and a molecular weight of from about 100,000 to about 225,000.

6. The device of claim 3 wherein said solvent is selected from dialkyl esters of phthalic acid; ethylene glycol ethers, citric acid esters and tlkyl benzoates and is present in amounts of from about 0.5 part to about 3.0 parts per part of resin.

7. The device of claim 3 wherein said solvent is dibutyl phthtlate.

8. A device of claim 3 wherein the chemiluminescent compound is selected from 3-aminophthalhydrazide; 2,4,5-triphenlimidazole; 10,10'-dialkyl-9,9' -biacridinium salts; 9-chlorocarbonyl-10-methylacridinium chloride-and bis-(substituted-phenyl) oxalates.

9. The device of claim 3 wherein the fluorescer is present and is selected from 9,10-bisphenylethynylanthracene; 1-chloro-9,10-bis phenylethynylanthracene and 2-chloro-9, 10-bis(para-methoxyphenyl)anthracene.

10. The device of claim 1 having a self-adhering surface on the outside of said back sheet.

11. The device of claim 1 wherein the chemiluminescent compound is bis(2,4,5-tichloro-6-carbopentoxyphenyl) oxalate.

* * * * *

UNITED STATES PATENT AND TRADEMARK OFFICE

CERTIFICATE OF CORRECTION

PATENT NO. : Re. 35,132

DATED : December 26, 1995

INVENTOR(S) : William E. Bay

John J. Freeman

It is certified that error appears in the above-indentified patent and that said Letters Patent is hereby corrected as shown below:

In Column 22, line 26 in Claim 1:
replace "heat sealed thereto, all its edges a bi-component front sheet,"
with:

--heat sealed thereto, at its edges a bi-component front sheet,--

In Column 22, line 58 in Claim 3:
replace "about to about 40 weight percent *of total resin* of polyvi-"
with:

--about 1 to about 40 weight percent *of total resin* of polyvi---

UNITED STATES PATENT AND TRADEMARK OFFICE

CERTIFICATE OF CORRECTION

PATENT NO. : Re. 35,132

DATED : December 26, 1995

INVENTOR(S) : William E. Bay

John J. Freeman

It is certified that error appears in the above-indentified patent and that said Letters Patent is hereby corrected as shown below:

In column 22, line 59 in Claim 3:
replace "nylchloride resin particles having a diameter about 130 to"
with:

--nychloride resin particles having a diameter of from about 130 to--

In Column 22, line 66 in Claim 4:
replace "erated particle phase constitute polyvinylchloride particles"
with:

--erated particle phase constitutes polyvinylchloride resin particles--

UNITED STATES PATENT AND TRADEMARK OFFICE

CERTIFICATE OF CORRECTION

PATENT NO. : Re. 35,132

DATED : December 26, 1995

INVENTOR(S) : William E. Bay

John J. Freeman

It is certified that error appears in the above-indentified patent and that said Letters Patent is hereby corrected as shown below:

In Column 23, line 7 in Claim 5:
replace "about 20,000, or mixtures of said particles and polyviny-"
with:

--about 120,000, or mixtures of said particles and poylviny---

In Column 23, line 13 Claim 6:
replace "citric acid esters and tlkyl benzoates and is present in"
with:

--citric acid esters and alkyl benzoates and is present in--

UNITED STATES PATENT AND TRADEMARK OFFICE

CERTIFICATE OF CORRECTION

PATENT NO. : Re. 35,132

DATED : December 26, 1995

INVENTOR(S) : William E. Bay

John J. Freeman

It is certified that error appears in the above-indentified patent and that said Letters Patent is hereby corrected as shown below:

In Column 23, line 17 in Claim 7:
replace "phthtlate."
with:

--phthalate.--

In Column 24, line 3 in Claim 8:
replace "triphenlimidazole; 10,10'-dialkyl-9,9' -biacridinium salts;"
with:

--triphenylimidazole: 10,10'-dialkyl-9,9' -biacridinuim salts;--

UNITED STATES PATENT AND TRADEMARK OFFICE

CERTIFICATE OF CORRECTION

PATENT NO. : Re. 35,132

DATED : December 26, 1995

INVENTOR(S) : William E. Bay

John J. Freeman

It is certified that error appears in the above-indentified patent and that said Letters Patent is hereby corrected as shown below:

In Column 24, line 4 in Claim 8:
replace "9-chlorolcarbonyl-10-methylacridinium chloride-and bis-"
with:

--9-chlorocarbonyl-10-methylacridinium chloride and bis-"

In Column 24, line 14 in Claim 11:
replace "compound is bis(2,4,5-tichloro-6-carbopentoxyphenyl)"
with:

--compound is bis(2,4,5-trichloro-6-carbopentoxyphenyl)--

Signed and Sealed this

Second Day of December,1997

*Attest:*

Bruce Lehman

BRUCE LEHMAN

*Attesting Officer*

*Commissioner of Patents and Trademarks*